Dec. 1, 1970 T. A. CHUBB 3,544,825

CAMERA TUBE INCLUDING CHANNEL ELECTRON MULTIPLIER
AND CHANNEL STORAGE SECTION

Filed March 6, 1968

INVENTOR

TALBOT A. CHUBB

BY Melvin L. Crane AGENT

ATTORNEY

United States Patent Office 3,544,825
Patented Dec. 1, 1970

3,544,825

CAMERA TUBE INCLUDING CHANNEL ELECTRON MULTIPLIER AND CHANNEL STORAGE SECTION

Talbot A. Chubb, 5023 38th St. North, Arlington, Va. 22207

Filed Mar. 6, 1968, Ser. No. 710,967
Int. Cl. H01j *31/26, 31/36*
U.S. Cl. 313—65 9 Claims

ABSTRACT OF THE DISCLOSURE

This invention is concerned with electronic imaging devices such as the orthicon, vidicon or image amplifier vidicon type. This imaging tube comprises four distinct sections, (1) a photoelectric surface which converts an optical image to an electron image, (2) an image amplifier comprising an array of channel amplifier imaging tubes, (3) an array of charge accumulating elements, and (4) an electron gun with conventional focusing and deflection means for sequentially scanning and neutralizing the stored image. The array of charge accumulating elements are unique and avoid the necessity of the usual insulator storage element.

The invention described herein may be manufactured and used by or for the Government of the United States of America for governmental purposes without the payment of any royalties thereon or therefor.

This invention relates to image intensifier apparatus and more particularly to an image intensifier with very high optical sensitivity and a unique electrode on which the output is produced.

Heretofore image amplifiers and electronic imaging devices have been used to obtain images of poorly illuminated objects in almost complete darkness. They have also been used to render visible objects illuminated by infrared or ultraviolet light, to which light the eye is not sensitive. Other imaging devices are concerned with image storage and display, in which lasting image displays are produced. To gain increased sensitivity at very low light levels some devices make use of image integration; that is, the effect of light is permitted to accumulate so as to gradually build up an image as in photographic time exposures. With electronic imaging devices the accumulating element is usually a "target electrode", typically a thin MgO dielectric film, which charges up with a pattern of electrons matching the optically-imaged dark scene. The electron pattern is converted to a T.V. video signal by use of a scanning readout electron beam from the usual electron gun assembly.

The subject imaging tube may be used to amplify images received and makes use of a system in which image accumulation and storage and image readout-neutralization occur on the same surface without involving electron penetration through an insulating film.

It is therefore an object of the present invention to provide an imaging tube which has a very high optical sensitivity.

Another object is to provide an image tube having a high signal-to-noise ratio and is of rugged construction.

Still another object is to provide an image tube which avoids excessive blooming if the optical field contains a local bright spot.

Yet another object is to provide an image tube which is capable of providing a quantitative relation between fluctuations in output current and variations in brightness of the image field.

While still another object is to provide a unique image storage section in an image tube.

Other and more specific objects of this invention will become apparent upon a more careful consideration of the following detailed description when taken together with the accompanying drawings, in which.

Figure 1:
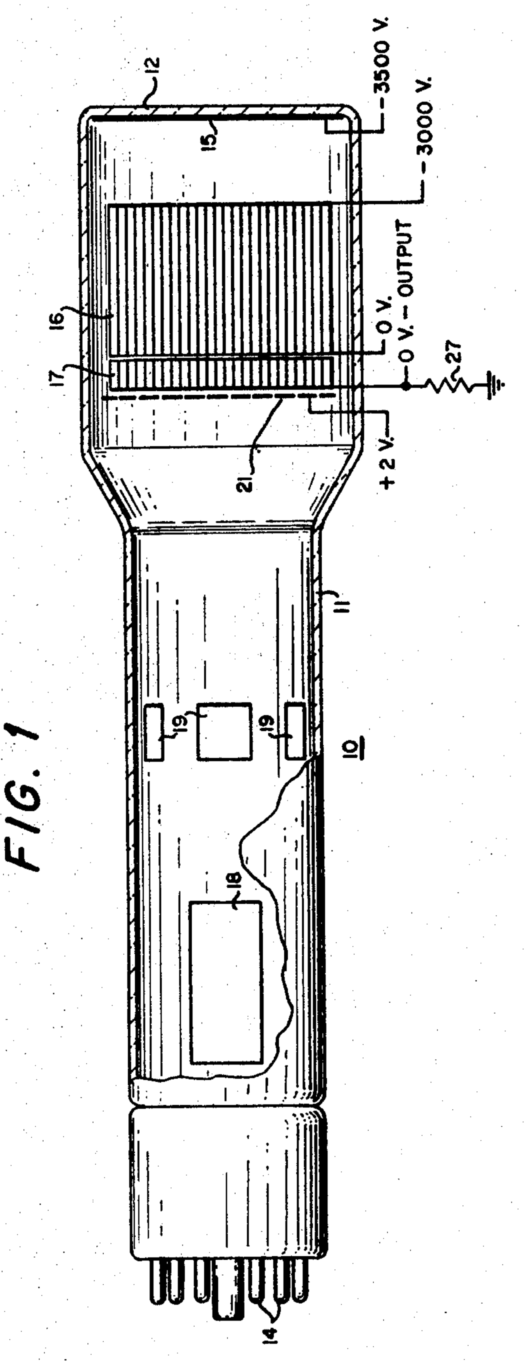
FIG. 1 illustrates a schematic view of a tube with the electrical potentials indicated.
Figure 2:
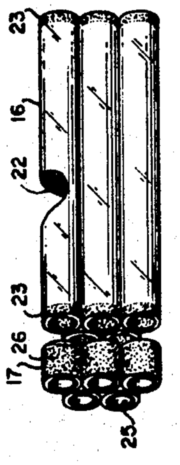
FIG. 2 is an enlarged view of the photomultiplier tube section and the image storage section.

Referring now to the drawing wherein like reference characters represent like parts throughout, there is shown by illustration in FIG. 1, a schematic of an image tube made according to this invention. The imaging tube 10 comprises an evacuated envelope 11 including at one end a window 12 that passes radiation to be detected and at the opposite end 13 suitable electrical connection pins 14 which connect the tube elements to the different electrical circuits. The tube includes four operable sections, the first of which is a photoelectric surface 15 that converts an incident optical image into an electron image. The second section is an electron image amplifier section comprising an array of channel amplifier imaging tubes 16. The third section comprises an array of charge accumulation elements 17 and the fourth section includes a conventional electron gun 18 with focusing and deflection electrodes 19. The tube is also provided with a field screen mesh 21 through which the electrons pass to the charge accumulating elements.

The photoelectric surface may be deposited onto or affixed adjacent the radiation transparent window to receive optical images that pass through the window. Optical radiation incident on the photoelectric surface excites electrons therein to emit electrons from each illuminated area in proportion to incident light. The electrons are accelerated toward the channel amplifier section and focused by an external magnetic field not shown for simplification of the drawing. If the photoelectric surface is close to the channel amplifier section rather than as shown in the drawing, the external magnetic field is not necessary. The channel amplifier section is formed by a plurality of closely packed, very small sized channels, ducts, or tubes of glass 16 for permitting individual streams of electron flow through each of the separate tubes normal to the photoelectric surface. The electron amplifier tubes are provided with inner surfaces 22 of low electrical conductivity with each end of the tubes metallized to form two electrodes 23, and a potential difference is placed between the electrodes. Suitable channel amplifiers are made with metal oxide glass, slightly chemically reduced to provide a top to bottom resistance of about $10^9$ ohms and the length of each of the tubes should be about fifty times their individual diameter. In section 2, the electrons forming the image are multiplied by channel amplifier multiplier action such as an amplification of from one to a hundred million.

The array of charge accumulating elements of section 3 is also made up of a plurality of channels, ducts, or glass tubes that match those of section 2. However, the tubes of section 3 are provided with highly insulating inside surfaces 25 with the outside 26 of the tubes conductive. The length of the tubes are about equal to the diameter, however, the length may be longer than the diameter. Since the outside surfaces of the tubes of section 3 are conductive the tubular array of section 3 provides an electrode upon which the video output of the tube is produced. The conducting outside electrode surfaces are not exposed to the image forming electron clouds produced in section 2 whereas the inner surface of the tubes of section 3 are exposed to the image forming electron clouds. The impact of the electron clouds on the insulating inner surfaces of the tubes of section 3 results in secondary electron emission such as in section 2. This secondary electron emission causes a net positive charge to accumulate on the insulating surfaces with the positive charges forming a pattern of strength vs. position matching the brightness pattern of the photoelectric surface of section 1. The secondary electrons from the insulated surface of section 3 together with the portions of the electron clouds from section 2 which pass directly through the tubes of section 3 are collected and neutralized on the field screen mesh or within the interior of the electron gun section which is at relatively positive potential.

Section 4 is a typical vidicon electron gun section which provides a focused electron beam which periodically scans across the back surface of the tubes of section 3. The electron gun thus, provides a moving cloud of electrons which periodically neutralizes local positive charges which have accumulated on the insulating inner surfaces of the tubes 17 of section 3. When these charges are neutralized, a negative signal is capacitively coupled into the video output electrode. Thus, as the electron beam from the electron gun scans across the image charge pattern stored on the tubular electrode of section 3, a time varying fluctuating signal matching this charge pattern is produced on the tube output electrode. Thus, the tube produces an output image corresponding to the image incident on the end of the tube. It is noted above that image pattern formation and also image neutralization occur on the same surface of insulating material.

In assembly of the tube, the various elements are provided with electrical connections to the outside according to well known principles. In operation the following electrical potentials are suggested. The photoelectric surface has a voltage supply of 3500 volts, the potential difference between the end electrodes of the tubes of section 2 is 3000 volts, wherein the voltage applied to the front end electrode is 3000 volts and the back electrodes have zero volts applied thereto. The outer surface of the tubes of section 3 has zero volts applied thereto and is connected to an output resistance 27 to ground from which the output of the tube is taken. The field screen mesh has a +2 volts applied thereto. The focusing and deflection electrodes and the electron gun have potentials applied thereto as in conventional imaging vidicon tubes.

In operation, the electrical circuitry to the imaging tube is directed toward the object of concern. An optical image is incident on the face of the tube and the photoelectric surface. The optical radiation incident on the photoelectric surface excites the electrons therein which are emitted by the photoelectric surface in proportion with the intensity of the incident image. The emitted electrons are directed or focused onto the ends of the tubes 16 wherein the electrons are directed into many individual paths within the tubes. The electrons in each tube strike the inner surface to produce secondary electrons. As the electrons travel the length of the tubes, the electrons may strike the surface many times producing secondary electrons each time that the surface is struck. During travel over the length of each of the tubes, the original electrons may be amplified $10^8$ times by secondary electron emission. The electrons are then directed onto the short tubes 17 which have an insulated inner surface and a conductive outer surface. Impact of said electrons onto the insulating surfaces of tubes 17 results in secondary electron emission just as is tube 16. This secondary emission by the insulating surfaces of tubes 17 causes a net positive charge to accumulate on the inner surfaces of tubes 17 wherein these charges form a pattern of strength vs. position, matching the brightness of the optical image on the photoelectric surface 15. The secondary electrons from the insulated surfaces of tubes 17 together with the portions of the electrons from tubes 16 which pass directly through tubes 17 are collected and neutralized on the field screen mesh or in the interior of the electron gun section which is at relatively positive potential.

The accumulation of positive charges on the insulated surfaces of tubes 17 are periodically scanned by the focused electrons from the electron gun section which periodically neutralizes the positive charges. When such charges are neutralized a negative signal is capacitatively coupled into the video output circuit. It is readily apparent to one skilled in the art that the instantaneous magnitudes of the output signals developed across the resistance are representative of the optical image radiation incident upon the photoelectric surface of the tube. These output signals may be made available for many obvious uses by utilization of conventional television recording techniques.

Thus, it can be seen that the present invention provides an imaging tube in which image storage and image readout-neutralization occur on the same surface without invloving electron penetration through an insulating film.

Obviously many modifications and variations of the present invention are possible in the light of the above teachings. It is therefore to be understood, that the invention may be practiced otherwise than as specifically described.

What is claimed and desired to be secured by Letters Patent of the United States is:

1. An image tube comprising a photo electric surface at one end adjacent a radiation transparent window and an electron gun at the opposite end thereof, an electron multiplier section formed of a plurality of axially aligned tubular members, each of said members having an outer conductive surface and an inner resistive, secondary emissive surface for electron multiplication of electrons from said photoelectric surface, and a charge accumulating body between said section and said electron gun comprising relatively short, contacting tubular members in axial alignment with the tubular members of said electron multiplier section, each of said relatively short tubular members having an inner coating of insulating, secondary emissive material and an outer conductive surface, whereby charges developed responsive to electrons from said multiplier section may be neutralized by electrons from said gun for generation and capacitive coupling of signals between said inner and outer surfaces.

2. In an image tube as claimed in claim 1, wherein, said surfaces of said body forming said openings are cylindrical.

3. In an image tube as claimed in claim 2, wherein one each of said openings in said body are in alignment with one each of said tubular members of said electron multiplier section.

4. In an image tube as claimed in claim 1, wherein, the diameter of each of said conductive tubular members of said body are approximately equal to the length thereof.

5. In an image tube as claimed in claim 1, wherein, said body is formed of a plurality of glass tubular members each having a conductive outside surface and a highly insulating inner surface.

6. In an image tube as claimed in claim 4, wherein one each of said glass tubular members of said body are in alignment with one each of said tubular members of said electron multiplier section.

7. In an image tube as claimed in claim 5 wherein the diameter of each of said glass tubular members of said body are approximately equal to the length thereof.

8. In an image tube as claimed in claim 7; wherein, the diameter of each of said electrically conductive tubular member of said body is about 0.010 inch.

9. In an image tube as claimed in claim 8; wherein, the wall thickness of each of said tubular members of said body is about .002".

References Cited

UNITED STATES PATENTS

| | | | |
|---|---|---|---|
| 2,055,593 | 9/1936 | Reynolds | 313—66 |
| 3,039,017 | 6/1962 | Brown et al. | 313—105X |
| 3,062,962 | 11/1962 | McGee | 313—67X |
| 3,128,408 | 4/1964 | Goodrich et al. | 313—68X |

ROBERT SEGAL, Primary Examiner

U.S. Cl. X.R.

313—68